United States Patent [19]
Michel et al.

[11] Patent Number: 5,616,674
[45] Date of Patent: Apr. 1, 1997

[54] METHOD OF PREPARING POLYCARBONATE-POLYSILOXANE BLOCK COPOLYMERS

[75] Inventors: Rodney L. Michel; Paul D. Sybert, both of Evansville, Ind.; Gary C. Davis, Albany, N.Y.; William J. Swatos, Mt. Vernon, Ind.

[73] Assignee: General Electric Company, Pittsfield, Mass.

[21] Appl. No.: 531,354

[22] Filed: Sep. 20, 1995

Related U.S. Application Data

[63] Continuation-in-part of Ser. No. 241,324, May 10, 1994, Pat. No. 5,519,105.

[51] Int. Cl.$^6$ ........................................... C08G 77/04
[52] U.S. Cl. .................. 528/29; 524/537; 525/474; 528/14; 528/15; 528/18; 528/19; 528/21; 528/25; 528/31; 528/32; 528/41; 528/43

[58] Field of Search ................ 524/537; 525/474; 528/14, 15, 18, 19, 21, 25, 31, 32, 41, 43, 29

[56] References Cited

U.S. PATENT DOCUMENTS

| | | | |
|---|---|---|---|
| 3,240,755 | 3/1966 | Cawthon et al. | 528/198 |
| 3,240,756 | 3/1966 | Cawthon et al. | 528/198 |
| 3,419,634 | 12/1968 | Vaughn | 528/29 |
| 3,419,635 | 12/1968 | Vaughn | 528/29 |
| 3,992,432 | 11/1976 | Napier | 558/344 |
| 5,391,692 | 2/1995 | Boden | 528/199 |

OTHER PUBLICATIONS

Journal, Macromol. Sci. Chem. 15(5), pp. 967–998 (1981).

*Primary Examiner*—Terressa Mosley

[57] ABSTRACT

Polycarbonate-polysiloxane block copolymers are prepared by interfacial polymerization technique in the presence or a phase transfer catalyst.

14 Claims, No Drawings

METHOD OF PREPARING POLYCARBONATE-POLYSILOXANE BLOCK COPOLYMERS

CROSS-REFERENCE TO RELATED APPLICATION

This application is a Continuation-In-Part of U.S. patent application Ser. No. 08/241,324 filed May 10, 1994 now U.S. Pat. No. 5,519,105.

BACKGROUND OF THE INVENTION

1. Field of the Invention

This invention relates to thermoplastic condensation polymers which are polycarbonate-polysiloxane block copolymers and to methods of their preparation.

2. Brief Description of Related Art

The preparation of polycarbonate and polyestercarbonate resins from monomer reactants by the step growth or interfacial polycondensation procedure is well known; see for example the U.S. Pat. Nos. 3,169,121 and 4,188,314. Generally, a catalyst is employed to accelerate the rate of polymerization of the dihydric phenol reactant with the carbonate precursor such as phosgene and with the dicarboxylic acid (ester precursor) when employed. Catalysts commonly employed are the tertiary amines, including quaternary ammonium salts; see U.S. Pat. Nos. 3,240,755 (Col. 5, lines 65–74) and 3,240,756. (Col. 1, lines 26–27). In these descriptions, the quaternary ammonium salts are equated to, for example, trialkylamines as effective catalysts to promote the polymerization rate of the monomer reactants.

More recently, it was shown that phase transfer catalysts, can be used in place of, or in addition to tertiary amines to prepare high molecular weight polycarbonates employing reduced amounts of phosgene reactant (see U.S. Pat. No. 5,391,692). Polymerizations with a phase transfer catalyst present requires from 5 to 10% less phosgene to obtain a complete molecular weight build. Because complete molecular weight build was achieved with either a tertiary amine or a phase transfer catalyst, sight excesses of phosgene over and above the stoichometric amount did not change the weight average molecular weight.

In any event, the patentees in U.S. Pat. No. 5,391,692 did not consider the difficulty of preparing siloxane-polycarbonate block copolymers which contain high concentrations of the siloxane block with consistent and predictable weight average molecular weights. In addition, it was not known that the use of a phase transfer catalyst could be used in a process that would give both good phosgene utilization and block copolymers with consistent and predictable weight average molecular weights.

The preferred block copolymers prepared by the method of the invention are eugenol end-capped polydimethylsiloxane-bisphenol-A derived polycarbonate block copolymer, useful as a blend stock for blending with polycarbonate homopolymer resins to obtain polycarbonates with modified lower temperature modified impact resistance properties. Also, a high weight percent siloxane concentrate for blending with polycarbonates reduces the production costs of preparing such block copolymer in two ways: first, less block copolymer has to be made if it is a polysiloxane high level concentrate and second, because there is less of the polycarbonate block in the copolymer, residence time in the preparative reactions, is dramatically reduced.

We have found that we can prepare 80% eugenol-capped polydimethylsiloxane/20% polycarbonate ratio block copolymer concentrates consistently with the use of a phase transfer catalyst to catalyze their copolymerization. This catalyst gives consistent weight average molecular weight control, where previously used, catalysts such as triethylamine did not produce consistent or predictable molecular weights, regardless of the endcap levels used. Indeed, some polymerizations using triethylamine catalyst never stopped building molecular weight. The phase transfer catalyzed reaction also shows a dramatic reduction in phosgene usage ($\leq 25\%$) at the high Si incorporation levels. The eugenol capped polydimethylsiloxane block copolymers show improved advantageous utility as a blend ingredient for use in preparing polycarbonate blends.

SUMMARY OF THE INVENTION

The invention comprises a process for preparing polycarbonate-polysiloxane block copolymers, which comprises;

A. providing a heterogeneous reaction mixture having at least two liquid phases, and which comprises:
  (i) a dihydric phenol;
  (ii) a polysiloxane diol;
  (iii) water;
  (iv) a water-immiscible, inert organic solvent for the block copolymer;
  (v) a catalytic proportion of a phase transfer polymerization catalyst which functions between the two phases; and B. introducing into the heterogeneous reaction mixture a carbonate precursor for co-polymerizing the dihydric phenol (i) with the polysiloxane diol ( ii).

DETAILED DESCRIPTION OF THE PREFERRED EMBODIMENTS OF THE INVENTION

The products of the process of the invention are polysiloxane-polycarbonate block copolymers consisting essentially of: (1) polycarbonate blocks having recurring units of the formula:

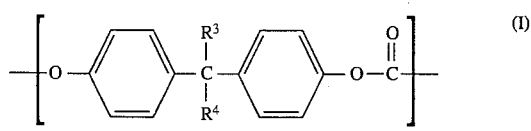

where $R^3$ and $R^4$ are each independently selected from hydrogen, hydrocarbyl or halogen-substituted hydrocarbyl, preferably methyl; and (2) polysiloxane blocks of the structure:

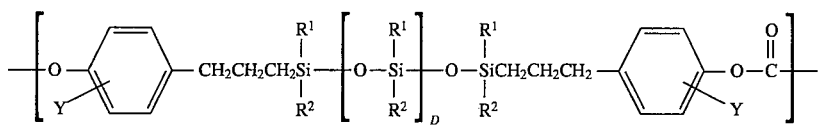

where $R^1$ and $R^2$ are each independently hydrogen, hydrocarbyl or halogen-substituted hydrocarbyl (preferably $R^1$ is methyl and $R^2$ is methyl or phenyl) and where D is an integer of from about 10 to about 120, preferably about 40–60; and Y is hydrogen, hydrocarbyl, hydrocarbyloxy or halogen, (preferably methoxy); and where the weight percentage of blocks of structure (I) is from about 10 to about 96% of the copolymer and the weight percentage of polysiloxane from the blocks of structure (II) is from about 4 to 90%. Preferably, the weight ratio of blocks o structure (I) to blocks of structure (II) is within the range of about 15 to 25%:75 to 85% by weight.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 to carbon atoms, inclusive, such as cyclopropyl, cyclobutyl, cyclopentyl, cyclohexyl, cycloheptyl, cyclooctyl and the like.

The term "halogen-substituted hydrocarbyl" as used herein means tie hydrocarbyl moiety as previously defined herein one or more hydrogen atoms have been replaced with halogen (chlorine, bromine, iodine, fluorine).

Preferred block copolymers are prepared by the reaction of a carbonate forming precursor, such as phosgene, with a mixture of a bisphenol of the formula:

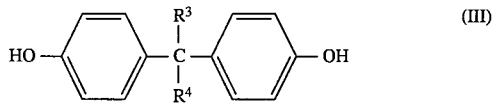

where $R^3$ and $R^4$ are as defined above; and a polysiloxane diol of the structure depicted by the formula:

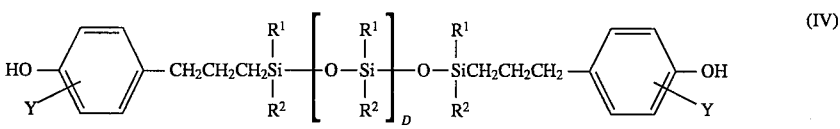

where $R^1$, $R^2$, Y and D are as defined above. A particularly preferred species of Formula (IV) is that in which $R^1$ and $R^2$ are methyl, Y is methoxy ortho to the phenolic hydroxyl, and D is an integer of about 45–55.

The bisphenol compounds of the formula (III) are represented by 2,2-bis-(4-hydroxyphenyl)propane (or bisphenol-A);

2,4'-dihydroxydiphenyl methane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl) heptane;
bis-(4-hydroxyphenyl)phenylmethane;
bis-(4-hydroxyphenyl)cyclohexymethane;
1,2-bis-(4-hydroxyphenyl)-1,2-bis-(phenyl) propane;
2,2-bis-(4-hydroxyphenyl)-1-phenylpropane; and the like.

The polysiloxane diols (IV) depicted above as precursors of the siloxane block may be characterized as bisphenolsiloxanes. The preparation of these bisphenolsiloxanes is accomplished by the addition of a polydiorganosiloxane (V) to a phenol (VI) containing an alkenyl substituent, according to the schematic formula:

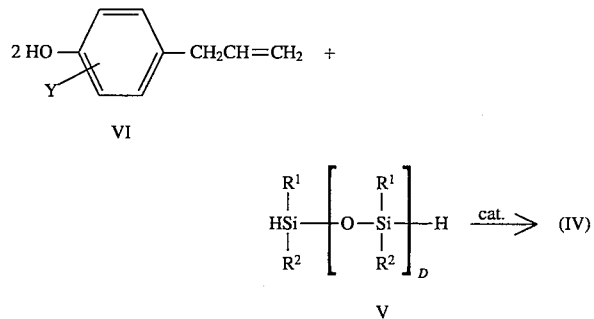

wherein $R^1$, $R^2$, Y and D are as defined above

The essential features of the process of preparing the polysiloxane diols of formula IV are described by Vaughn, U.S. Pat. No. 3,419,635 (December 1968), which is incorporated by reference. For instance, the process is exemplified in example 8 of this Vaughn patent which describes the addition of a hydrogen-terminated polydimethylsiloxane to an allylphenol in the presence of a catalytic amount of chloroplatinic acid-alcohol complex at 90°–115° C.

Particularly preferred polysiloxane blocks are readily prepared by addition of a hydrogen-terminated polysiloxane to two molar equivalents of eugenol (4-allyl-2-methoxyphenol) in a reaction advantageously catalyzed by platinum or its compounds.

The hydrogen-terminated polysiloxanes of formula (V) are well-known compositions, being described along will methods for their preparation, in Vaughn U.S. Pat. Nos. 3,419,634 and 3,419,635, both incorporated herein by reference thereto.

The allylphenols of formula (VI) are also well known compounds, described along with methods for their preparation, by Tarbell, Chemical Reviews 27, 495ff (1940).

A particularly preferred compound of Formula (VI) is eugenol, 4-allyl-2-methoxyphenol, since it is readily available as a synthetic or as a natural product and affords a bisphenolpolysiloxane (IV) of favorable reactivity.

The conversion of the bisphenolpolysiloxane (V) and the bisphenol (III) to the block copolymer may be conducted by known interfacial polymerization processes for making polycarbonates, such as the methods set forth in U.S. Pat. Nos. 4,018,750 and 4,123,436 by reaction with a carbonate precursor. Both patents are incorporated herein by reference thereto.

The carbonate precursor employed in the preparation of the block copolymers may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of dihydric phenols such as bischloroformates of 2,2-bis(4-hydroxyphenyl)propane, hydroquinone and the like.

The preferred carbonate precursors are the carbonyl halides, with carbonyl chloride, also known as phosgene, being the preferred carbonyl halide.

Although the preparative processes may vary, the preferred processes typically involve dissolving or dispersing the reactants in a suitable water immiscible solvent medium and contacting the reactants with a carbonate precursor, in the presence of a phase transfer catalyst, preferably a tertiary amine co-catalyst and an aqueous caustic solution under controlled pH conditions. Sufficient alkali metal hydroxide base can be utilized to raise and maintain the pH of the mixture. The base is added in sufficient proportion to maintain a pH of the aqueous part of the reaction mixture within the range of from about 10 to about 12, preferably 11 to about 12. The pH of the aqueous phase of the reaction mixture may also be controlled by the gradual addition of caustic such as sodium hydroxide, using an automatic pH controller.

A molecular weight regulator, that is a "chain stopper", may be added to the reactants prior to or during the contacting of them with a carbonate precursor. Useful molecular weight regulators include, but are not limited to, monohydric phenols such as phenol, chroman-I, paratertiarybutylphenol and the like. Techniques for the control of molecular weight are well known in the art and may be used in the present process for controlling the weight average molecular weight of the block copolymer product resins.

The most commonly used water immiscible solvents include methylene chloride, 1,2-dichloroethane, chlorobenzene, toluene and the like.

The preferred process comprises a phosgenation reaction. The temperature at which the phosgenation reaction proceeds may vary from below 0° C., to above 100° C. The reaction preferably proceeds at temperatures of from room temperature (25° C.) to 50° C. Since the reaction is exothermic, the rate of phosgene addition may be used to control the reaction temperature. The amount of the phosgene required will generally depend upon the amount of the dihydric phenol and diol present. Generally speaking, one mole of phosgene will react with one mole of the dihydric phenol and the polysiloxane diol to provide the polymer and two moles of HC. The foregoing amounts of phosgene are herein referred to as stoichiometric or theoretical amounts. The two moles of HCl are in turn "neutralized" by an acid acceptor. Suitable acid acceptors are either a hydroxide, a carbonate, a bicarbonate, or a phosphate or an alkaline earth metal hydroxide.

The phosgenation reaction may be carried out at sub-atmospheric or super-atmospheric pressures if desired. However, there is generally no great advantage to carrying out the process of the invention under other than ambient reaction vessel pressures occurring at the temperature under which the reaction is conducted.

The phosgenation reactions occurring during the process of the invention are generally completed within a period of from about ten minutes to several hours.

The reaction mixture should be agitated to enhance contact between phases and thereby promote the rate of reaction.

Prior to product resin recovery which can be achieved by standard techniques, such as filtration, decantation and centrifugation, chloroformate end groups are normally substantially eliminated. When a phase transfer catalyst is used without a co-catalyst, the reaction mixture can be agitated for a long period of time until the presence of chloroformates can no longer be detected. Alternatively, the addition of an equivalent level of a phenolic compound, based on the level of chloroformate, can be added at the end of the reaction.

The addition of a greater than stoichiometric amount of phosgene to the reaction mixture leads to formation of chloroformate end groups. These end groups must normally be substantially removed before the polymer is isolated, as mentioned above. The chloroformates can be eliminated by any of the above mentioned methods, the preferred method is by the presence of a tertiary amine co-catalyst in the reaction mixture. The tertiary amine co-catalyst hydrolyses the chloroformates, while the newly formed phenolic end groups react with the residual chloroformates to give a fully built polymer.

The tertiary amine co-catalysts used preferably in the process of the invention may be represented by those having the formula:

$$R^{14}{}_3N \qquad (XX)$$

where each of the $R^{14}$ are independently selected from the group of $C_2$ to $C_{10}$ alkyl radicals. Preferred tertiary amine catalysts (XX) include, but are not limited to, triethylamine, ethyl-morpholine and the like.

In accordance with the present invention, the co-catalyst is employed is an effective amount for phase catalysis of the chloroformate end groups.

The amount of tertiary amine co-catalyst used ranges from about 0.01 to 6.00 mole % based on the moles of bisphenol-A present in the reaction medium. A more preferred range is 0.01 to 2.00 mole %, and the most preferred range is 0.20 to 0.70 mole %.

n the present invention a binary catalyst system comprising a phase transfer catalyst and a tertiary organic amine, the chloroformates react after a few minutes leading to a kinetically improved process. The reaction mixture containing chloroformates is agitated until the presence of chloroformates can not be detected. A detection procedure based on Agree et al can be used employing 4-(4-nitrobenzyl)pyridine (NBP) as shown in Talanta, 1966,13,1151–1160. Spot testing using commercially available phosgene detection paper, such as Chemcasette SP from MDA Scientific of Lincolnshire, Ill., with a portion of the reaction mixture also can be employed.

Phase transfer catalysts, including quaternary ammonium salts, function to transfer the water-soluble reactant across the interface into the organic phase where a homogeneous reaction can take place rapidly. Thus, in the reaction involving a water soluble nucleophile, the addition of the phase transfer catalyst causes the transfer of the nucleophile as an ion pair into the organic phase where it reacts with the organic reagent (phosgene). Migration of the cationic catalyst back to the aqueous phase completes the cycle.

Phase transfer catalysts are generally well-known in the art as is their preparation and include quaternary salts and quaternary resins where the central atom is nitrogen, phosphorus, arsenic, bismuth, antimony and the like; amine salts, ammonium salts, crown ethers, polyethers, cryptands, phosphonium salts, arsonium salts, antimonium salts, bismuthonium salts, alphaphosphorylsulfoxides, sulfones, sulfides and the like; see for example the U.S. Pat. No. 3,992,432 (Stark et al.) incorporated herein by reference thereto.

Representative of phase transfer catalysts which may be used in the process of the invention are those of the formula:

(VII)

wherein X is selected from the group consisting of an organic and inorganic anion such as nitrate, benzoate, phenylacetate, hydroxybenzoate, phenoxide, hydroxide, cyanide, nitrite; particularly preferred are chloride, bromide, acetate, formate, propionate, hydrogen sulfate, methyl sulfate, ethyl sulfate and the like; M represents nitrogen, arsenic, phosphorus, antimony or bismuth; $R_5$, $R_6$, $R_7$ and $R_8$ are each selected from one of those groups wherein A. $R_5$, $R_6$, $R_7$ and $R_8$ are each independently selected from hydrocarbyl and substituted hydrocarbyl, the sum of carbon atoms in $R_5$, $R_6$, $R_7$ and $R_8$ is between 8 and 100, inclusive, and when any one or more of $R_5$, $R_6$, and $R_7$ have only 1 carbon atom, then the sum of carbon atoms in $R_5$, $R_6$, $R_7$ and $R_8$ is between 9 and 100 carbon atoms, inclusive;

B.
1. $R_5$ and $R_6$ are taken together to represent a divalent moiety attached to the atom M, and is selected from the group consisting of alkenylene and hydrocarbyl-substituted alkenylene having 5 to 10 carbon atoms, inclusive, in the ring thereof, $R_7$ and $R_8$ are each selected independently from hydrocarbyl and substituted hydrocarbyl of from 1 to 25 carbon atoms, inclusive, provided that when $R_5$ and $R_6$ together are not alkenylene substituted with a hydrocarbyl of at least 8 carbon atoms, then one of $R_7$ and $R_8$ is hydrocarbyl or substituted hydrocarbyl of at least 8 carbon atoms;

2. $R_5$ and $R_6$ are taken together with the atom of M to which they are attached to represent a divalent or trivalent moiety selected from the groups consisting of those having the formulae:

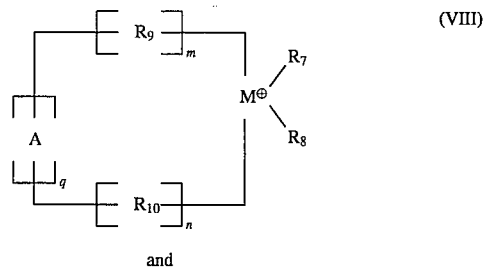

and

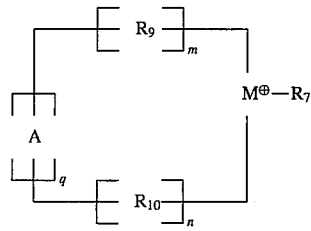

wherein A represents nitrogen, oxygen, sulfur, phosphorus and the like; and $R_9$ and $R_{10}$ are each selected from alkenylene and hydrocarbyl-substituted alkenylene of 1 to 25 carbon atoms, inclusive, m, n and g are each integers of 0 to 1 and the sum of m+n is 1 or 2, provided that $R_9$ and $R_{10}$ together are such that they contain a total of at least 3 carbon atoms; $R_5$ and $R_y$ are each selected independently from hydrocarbyl and substituted hydrocarbyl wherein $R_6$ is of from 1–25 carbon atoms, inclusive, and $R_8$ is of from 0–25 carbon atoms, inclusive, provided that when $R_9$ and $R_{10}$ together are not alkenylene substituted with a hydrocarbyl of at least 8 carbon atoms, then $R_9$ and $R_{10}$ are each selected from the group of alkyl, substituted alkyl, alkenyl and substituted alkenyl of at least 8 carbon atoms.

The term "hydrocarbyl" as used herein regarding the formulae VII, VIII and IX has the meaning previously ascribed to it and also includes alkenyl of 2 to 25 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, pentacosynyl and isomeric forms thereof.

The term "alkenylene" as used in the paragraph immediately above means the divalent moiety obtained on removal of two hydrogen atoms, each from a non-adjacent carbon atom of a parent hydrocarbon and includes alkenylene of 3 to 10 carbon atoms, inclusive, such as 1,3-propenylene, 1,4-butenylene, 1,5-pentenylene, 1,8-octenylene, 1,10-decenylene and the like.

The terms "substituted hydrocarbyl", "substituted alkyl", "substituted alkenyl", "substituted alkenylene" and "substituted aralkyl" as used immediately above mean the hydrocarbyl moiety as defined above wherein one or more hydrogen atoms nave been replaced with an inert group, i.e.; a chemical group which does not adversely affect the desired catalytic function of the catalyst of formula (VII). Representative of such groups are amino-, phosphino-, hydrocarbyl, quaternary nitrogen (ammonium), quaternary phosphorus (phosphonium) hydroxyl-, amide, alkoxy, mercapto-, nitro-, alkyl,, halo-, sulfone, sulfoxide, phosphate, phosphite, carboxylate groups and the like.

Catalyst compounds of the formula (VII) given above are generally well-known as are methods of their preparation.

Representative of such catalyst compounds are tributylmethylammonium chloride, trioctylmethylammonium chloride, tetrahexylammonium chloride, tetrabutylammonium chloride, tetrabutylphosphonium chloride, dioctyldimethylammonium chloride, dicocodimethylammonium chloride, didodecyldimethylammonium chloride ditetradecyldimethylammonium chloride, dioctadecyldimethylammonium chloride, dihydrogenated-tallow dimethylammonium chloride, distearyldimethylammonium chloride, dihydrogenated tallow dimethylammonium methyl sulfate, didecyldimethylammonium chloride, diheptyldimethyl ammonium chloride dodecyldimethylbenzylammonium chloride, tetradcyldimethylbenzylammonium chloride, hexadecyldimethylbenzylammonium chloride, dimethylethylcetylammonium chloride, cetyltrimethylammonium chloride, tributylmethylammonium chloride, cocoimidazoline-benzyl chloride, N,N-cetylethylmorpholinium ethosulate, methyl(1)cocoamidoethyl(2)cocoimid-azolinium methyl sulfate, N-tallow-pentamethyl-propanediammonium dichloride, triphenylpropyl-phosphonium bromide, tetraethylammonium chloride, N,N-soya ethylmorpholinium ethosulfate, hexa-decylpyridinium chloride, triethylbenzylammonium chloride, benzyl hydroxyethyl(2)cocoimidazolinium chloride, dodecyldiethyl(ethylbenzyl)ammonium chloride, tetradecyldimethyl(ethylbenzyl)ammonium chloride, hexadecyldimethyl(ethylbenzyl)ammonium chloride, octadecyldimethyl(ethylbenzyl)ammonium chloride, octadecyldimethylbenzylammonium chloride, dodecyldidethyldichlorobenzylammonium chloride, tetradecyldimethyldichlorobenzylammonium chloride, hexadecyldimethyldicnlorobenzylammonium chloride, octadecyldimethyldiclorobenzylammonium chloride, tetradecyltrimethylammonium chloride, soyatrimethylammonium chloride, hydrogenated-tallow trimethylammonium, chloride, cocotrimethylammonium chloride, tallowtrimethylammonium chloride, methyl bis(2-hydroxyethyl)cocoammonium chloride, methyl(1) soyaamidoethyl(2)soyaimidazolinium methyl sulfate, methyl(1)tallow amidoethyl(2)tallow imidazolinium methyl sulfate, methyl(1)oleylamidoethyl(2)oleylmidazolinium methyl sulfate and the like.

It will be appreciated that under specific conditions of operating the process of the invention, certain of the above described catalysts of the formula (VII) given have advantages over other catalysts for use under specific process conditions. For optimum yields, trial and error techniques may be followed. Particularly preferred in the process of the invention are phase transfer catalysts which are included within the formulae,

[CH₃(CH₂)₃]₄NX      (X)

[CH₃(CH₂)₅]₄NX      (XI)

[CH₃(CH₂)₆]₄NX      (XII)

and

CH₃[CH₃(CH₂)₃]₃NX      (XIII)

where X is as defined above, most preferably selected from Cl, Br or —OR¹³, or where R¹³ is a member selected from H; alkyl of 1–18 carbon atoms; aryl of 6–18 carbon atoms.

In addition to the phase transfer catalysts of formula (I), there are included within formulae (XI) and (XII), phase transfer catalysts having the formulae,

CH₃(C₄H₉)₃NX,      (XIV)

CH₃(C₄H₉)₃PX'      (XV)

C₂H₅(C₆H₁₃)₃NX,      (XVI)

(C₄H₉)₃N—(CH₂)₆—N(C₄H₉)₃, 0.2X      (XVII)

(C₃H₇)₃N—(CH₂)₆—N(C₃H₇)₃, 0.2X      (XVIII)

and

CH₃(C₅H₁₁)₂N—(CH₂)₄—N(C₅H₁₁)₂CH₃, 0.2X      (XIX)

where X is as previously defined. Generally the quantity of phase transfer catalyst used ranges from about 0.05 mole % to about 10.00 mole % phase transfer catalyst based on the total moles of bisphenol and polysiloxane diol. The phase transfer catalyst may be added in a preformed state or may be formed in situ in the reaction mixture by addition of the appropriate precursor compounds. The formation of, for example, quaternary salts within a reaction mixture by addition of precursor compounds is within the skill of the art.

Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of 0.2–1.1. When the preferred organic liquid is utilized, such as methylene chloride, the reaction may be conducted at reflux which can be 35°–42° C.

Progress of the reaction comprising the process of the invention may be monitored employing conventional analytical techniques.

Those skilled in the art will appreciate that many modifications may be made to the above described preferred embodiments of the invention without departing from the spirit and scope of the invention.

The following examples describe the manner and process of making and using the invention and set forth the best mode contemplated by the inventors for carrying out the invention but are not to be construed as limiting. All parts are by weight unless otherwise indicated.

Examples 1–3, below, are not examples of the invention, but are made for purposes of comparison.

COMPARATIVE EXAMPLE NO. 1

A stirred slurry of 435.25 grams (1.9 mol) of bisphenol-A (BPA), 2009 grams (0.48 mol) of eugenol capped polydimethylsiloxane D₅₀ block monomer (PDMS D₅₀), 22.7 grams (0.107 mole) of p-cumylphenol and 14 ml (0.10 mole) of triethylamine in 4 liters of methylene chloride and 4 liters of water was phosgenated for 71 minutes at a rate of 10 grams/minute and maintaining the pH between 11 to 12 with aqueous sodium hydroxide, To determine the progress of the reaction, samples were taken and molecular weights were obtained (Table No. 1) by increasing amounts of phosgene. Each sample of the organic layer was separated and washed with dilute HCl and water. The weight average molecular weight (MW) was determined by gel permeation chromatography (GPC) in methylene chloride relative to polycarbonate standards, TABLE No. 1

| Sample | Comparative Example | |
|---|---|---|
|  | Phosgene Usage | Molecular Weight |
| 26 min. | 260 grams | 18,958 |
| 32.5 min. | 325 grams | 31,682 |
| 39 min. | 390 grams | 39,911 |
| 45.5 min. | 455 grams | 40,589 |

COMPARATIVE EXAMPLE NO. 2

A stirred slurry of 435.25 grams (1.9 mol) of bisphenol-A (BPA), 2009 grams (0.48 mol) of eugenol capped polydimethylsiloxane D₅₀ block monomer (PDMS D₅₀), 22.7 grams (0.109 mole) of p-cumylphenol and 14 ml (0.10 mole) of triethylamine in 9 liters of methylene chloride and 6 liters of water was phosgenated for 71 minutes at a rate of 10 grams/minute and maintaining the pH between 11 to 12 with aqueous sodium hydroxide. To determine the progress of the reaction, samples were taken and molecular weights were obtained (Table No. 2) by increasing amounts of phosgene. Each sample of the organic layer was separated and washed with dilute HCl and water. The weight average molecular weight (MW) was determined by gel permeation chromatography (GPC in methylene chloride relative to polycarbonate standards.

TABLE No. 2

| Comparative Example | | |
| --- | --- | --- |
| Sample | Phosgene Usage | Molecular Weight |
| 26 min. | 262 grams | 14,053 |
| 40 min. | 381 grams | 20,216 |
| 56 min. | 513 grams | 29,632 |
| 71 min. | 637 grams | 32,785 |

COMPARATIVE EXAMPLE No. 3

A stirred slurry of 435.25 grams (1.9 mol) of bisphenol-A (BPA), 2009 grams (0.48 mol) of eugenol capped polydimethyliloxane $D_{50}$ block monomer (PDMS $D_{50}$), 22.7 grams (0.286 mole) of p-cumylphenol and 14 ml (0.201 mole) of triethylamine in 9 liters of methylene chloride and 6 liters of water was phosgenated for 71 minutes at a rate of 10 grams/minute and maintaining the pH between 11 to 12 with aqueous sodium hydroxide. To determine the progress of the reaction, samples were taken and molecular weights were obtained (Table No. 2) by increasing amounts of phosgene. Each sample of the organic layer was separated and washed with dilute HCl and water. The weight average molecular weight (MW) was determined by gel permeation chromatography (GPC in methylene chloride relative to polycarbonate standards.

TABLE No. 3

| Comparative Example | | |
| --- | --- | --- |
| Sample | Phosgene Usage | Molecular Weight |
| 26 min. | 278 grams | 7,976 |
| 40 min. | 402 grams | 12,866 |
| 56 min. | 546 grams | 18,007 |
| 71 min. | 637 grams | 21,930 |

EXAMPLE NO. 4

A stirred slurry of 435.25 grams (1.9 mol) of bisphenol-A (BPA), 2009 grams (0.48 mol) of eugenol capped polydimethylsiloxane $D_{50}$ block monomer (PDMS $D_{50}$), 30.32 grams (0.143 mole) of p-cumylphenol and 24.0 grams (0.076 mole)methyltributylammonium chloride (MTBA), 3.5 ml. (0.0251 mole) triethylamine in 5 liters of methylene chloride and 4 liters of water was phosgenated for 71 minutes at a pH of 11 to 12 controlled with aqueous sodium hydroxide. To determine the progress of the reaction, samples were taken and molecular weights were obtained referred to as (Example Table No. 4) by increasing amounts of phosgene. Each sample of the organic layer was separated and washed with dilute HCl and water. The weight average molecular weight (MW) was determined by gel permeation chromatography (GPC) in methylene chloride relative to polycarbonate standards.

TABLE No. 4

| Sample | Phosgene Usage | Molecular Weight |
| --- | --- | --- |
| 26 min. | 258 grams | 18,239 |
| 40 min. | 366 grams | 30,162 |
| 56 min. | 499 grams | 30,933 |
| 71 min. | 613 grams | 30,939 |

EXAMPLE NO. 5

A stirred slurry of 435.25 grams (1.9 mol) of bisphenol-A (BPA), 2009 grams (0.48 mol) of eugenol capped polydimethylsiloxane $D_{50}$ block monomer (PDMS $D_{50}$), 23.24 grams (0.099 mole) of p-cumylphenol and 24.0 grams (0.076 mole)methyltributylmmonium chloride (MTBA), 3.5 ml. (0.0251 mole) of triethylamine in 5 liters of methylene chloride and 4 liters of water was phosgenated for 71 minutes at a pH of 11 to 12 controlled with aqueous sodium hydroxide. To determine the progress of the reaction, samples were taken and molecular weights were obtained (Table No. 4) by increasing amounts of phosgene. Each sample of the organic layer was separated and washed with dilute HCl and water. The weight average molecular weight (MW) was determined by gel permeation chromatography (GPC) in methylene chloride relative to polycarbonate standards.

TABLE No. 5

| Sample | Phosgene Usage | Molecular Weight |
| --- | --- | --- |
| 26 min. | 252 grams | 25,084 |
| 40 min. | 373 grams | 31,139 |
| 56 min. | 504 grams | 34,738 |
| 71 min. | 599 grams | 34,415 |

EXAMPLE NO. 6

A stirred slurry of 435.25 grams (1.9 mol) of bisphenol-A (BPA), 2009 grams (0.48 mol) of eugenol capped polydimethylsiloxane $D_{50}$ block monomer (PDMS $D_{50}$), 23.24 grams (0.099 mole) of p-cumylphenol and 24.0 grams (0.076 mole) methyltributylmmonium chloride (MTBA), 3.15 ml. (0.0251 mole) of triethylamine in 5 liters of methylene chloride and 4 liters of water was phosgenated for 71 minutes at a pH of 11 to 12 controlled with aqueous sodium hydroxide. To determine the progress of the reaction, samples were taken and molecular weights were obtained (Table No. 4) by increasing amounts of phosgene. Each sample of the organic layer was separated and washed with dilute HCl and water. The weight average molecular weight (MW) was determined by gel permeation chromatography (GPC) in methylene chloride relative to polycarbonate standards.

TABLE No. 6

| Sample | Phosgene Usage | Molecular Weight |
| --- | --- | --- |
| 26 min. | 274 grams | 25,231 |
| 40 min. | 383 grams | 34,514 |
| 56 min. | 524 grams | 33,703 |
| 71 min. | 701 grams | 33,984 |

The results observed from the Examples 1–6, inclusive, indicate that with the standard tertiary amine catalyst (triethylamine) complete molecular weight build cannot be obtained with a reasonable amount of phosgene regardless of the reaction solids, or amount of chain terminator. The reactions continue to build molecular weight as more phosgene is added. These results make it extremely difficult to prepare resin with a consistent weight average molecular weight. In addition, a large excess of phosgene is needed to build weight average molecular weight. With phase transfer catalysts (such as methyltributyl-ammonium chloride), however, complete weight average molecular weight build is obtained. Thus, once the required amount of phosgene is added, small variations in the excess of phosgene will not change the weight average molecular weight as in the triethylamine polymerizations. Thus, the weight average molecular weight can be more precisely controlled with phase transfer catalysts by controlling the amount of the chain terminator and by using a slight excess of the required phosgene.

What is claimed is:

1. A process for preparing a polycarbonate-polysiloxane block copolymer which comprises;

charging to a reactor
(i) a dihydric phenol;
(ii) a polysiloxane diol of the formula

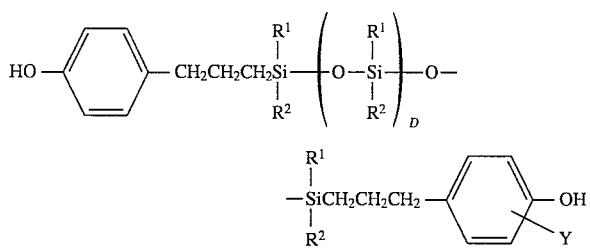

wherein $R^1$ and $R^2$ are each independently hydrogen, hydrocarbyl or halogen-substituted hydrocarbyl; D is an integer of from about 10 to about 120, and Y is hydrogen, hydrocarbyl, hydrocarbyloxy or halogen;
(iii) water;
(iv) a water-immiscible, inert organic solvent for the block copolymer;
(v) a catalytic proportion of a phase transfer polymerization catalyst to form a heterogeneous reaction mixture having an organic phase and an aqueous phase.

agitating the reaction mixture to enhance contact between the phases, adding to the heterogeneous reaction mixture a carbonate precursor and copolymerizing the dihydric phenol (I) with the polysiloxane diol (ii), whereby the phase transfer polymerization catalyst functions to transfer water soluble reactants into the organic phase where a homogeneous reaction can take place rapidly.

2. The process of claim 1 wherein the weight percentage of blocks of (i) is from about 10 to about 96% of the copolymer and the weight percentage of blocks of (ii) is from about 4 to 90%.

3. The process of claim 1 wherein the dihydric phenol is bisphenol-A.

4. The process of claim 1 wherein the catalytic proportion is from about 0.05 to about 10.0 mole % catalyst based on the total moles of bisphenol and polysiloxane diol.

5. The process of claim 1 wherein the phase transfer catalyst is tributylmethylammonium chloride.

6. The process of claim 2 wherein R and $R^2$ are each methyl, Y is methoxy ortho to the phenolic hydroxyl and D is an integer of from 45 to 55.

7. The process of claim 1 wherein the reaction mixture further comprises an effective proportion to eliminate chloroformate end groups on the product resin, of a tertiary amine co-catalyst.

8. The process of claim 7 wherein the tertiary amine is of the formula:

wherein $R^{14}$ represents $C_2$ to $C_{10}$ alkyl radicals.

9. The process of claim 8 wherein the tertiary amine is triethylamine.

10. The process of claim 8 wherein the effective proportion of the co-catalyst ranges from about 0.01 to 6.00 mole % based on the moles of bisphenol present.

11. The process of claim 10 wherein the phase transfer catalyst is tributylmethylammonium chloride and the tertiary amine is triethylamine.

12. The process of claim 1 wherein base is added to the reaction mixture to maintain a pH of the aqueous part within the range of from about 10 to about 12.

13. The process of claim 1 wherein the carbonate precursor is phosgene.

14. The process of claim 1 wherein the phase transfer catalyst is of the formula:

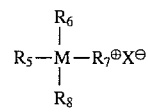

wherein X is an anion selected from the group consisting of nitrate, benzoate, phenylacetate, hydroxybenzoate, phenoxide, hydroxide, cyanide, nitrite, chloride, bromide, acetate, formate, propionate, hydrogen sulfate, methyl sulfate and ethyl sulfate, M represents nitrogen, arsenic, phosphorus, antimony or bismuth; $R_5$, $R_6$, $R_7$, and $R_8$ are each independently hydrocarbyl provided that the sum of carbon atoms in $R_5$, $R_6$, $R_7$, and $R_8$ is between 8 and 100, inclusive, provided that when any of $R_5$, $R_6$, and $R_7$ have only 1 carbon atom, then the sum of carbon atoms in $R_5$, $R_6$, $R_7$, and $R_8$ is between 9 and 100 carbon atoms, inclusive; or $R_5$ and $R_6$ are taken together to represent an alkenylene having 5 to 10 carbon atoms, inclusive, in the ring thereof and $R_7$ and $R_8$ are each independently hydrocarbyl of from 1 to 25 carbon atoms, inclusive and provided that when $R_5$ and $R_6$ together are not alkenylene of at least 8 carbon atoms, then one of $R_7$ and $R_8$ is hydrocarbyl of at least 8 carbon atoms; or $R_5$, $R_6$ and M represent a divalent or trivalent moiety selected from

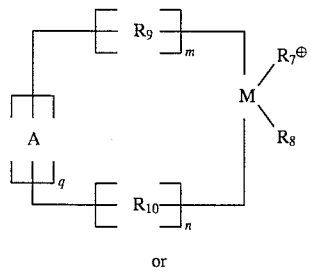

or

-continued

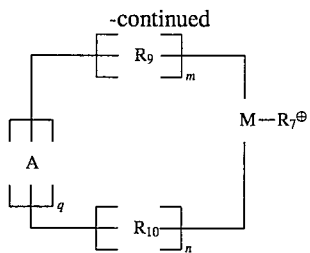

wherein A represents nitrogen, oxygen, sulfur or phosphorus and $R_9$ and $R_{10}$ are each alkenylene of 1 to 25 carbon atoms, inclusive, m, n and q are each integers of 0 to 1 and the sum of m+n is 1 or 2, provided that $R_9$ and $R_{10}$ together contain a total of at least 3 carbon atoms and provided that when $R_9$ and $R_{10}$ together are not alkenylene of at least 8 carbon atoms, then $R_{10}$ is selected from alkyl or alkenyl of at least 8 carbon atoms.

* * * * *

UNITED STATES PATENT AND TRADEMARK OFFICE
CERTIFICATE OF CORRECTION

PATENT NO. : 5,616,674
APPLICATION NO. : 08/531354
DATED : April 1, 1997
INVENTOR(S) : Rodney L. Michel et al.

It is certified that error appears in the above-identified patent and that said Letters Patent is hereby corrected as shown below:

Claim 1, in the Formula in (ii), delete Formula (ii):
"(ii) a polysiloxane diol of the formula

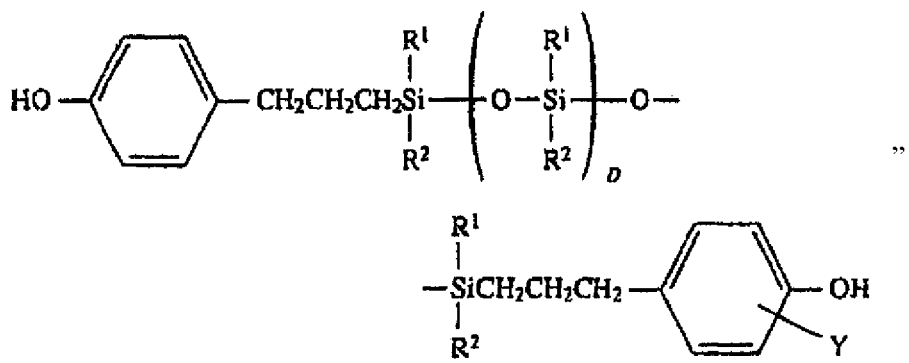

"

Formula should read as -- (ii) a polysiloxane diol of the formula

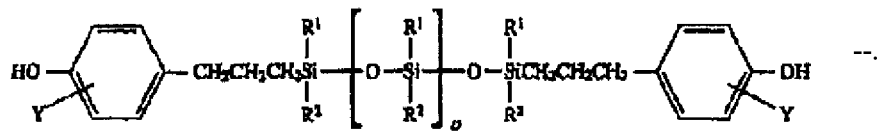

--.

Signed and Sealed this

Thirteenth Day of October, 2009

David J. Kappos
*Director of the United States Patent and Trademark Office*